United States Patent [19]

Schoofs et al.

[11] 4,370,526
[45] Jan. 25, 1983

[54] ARRANGEMENT FOR APPLYING A RINGING VOLTAGE TO A SUBSCRIBER'S LINE

[75] Inventors: Franciscus A. C. M. Schoofs; Aloysius J. Nijman; Frederik van Dongen, all of Eindhoven, Netherlands

[73] Assignee: U.S. Philips Corporation, New York, N.Y.

[21] Appl. No.: 230,214

[22] Filed: Feb. 2, 1981

[30] Foreign Application Priority Data

Feb. 12, 1980 [NL] Netherlands .......................... 8000859

[51] Int. Cl.³ .......................................... H04M 19/02
[52] U.S. Cl. .............................. 179/51 AA; 179/84 R; 179/18 HB
[58] Field of Search .............. 179/84 R, 84 A, 18 HB, 179/51 AA, 18 F, 18 FA, 17 E, 2.51

[56] References Cited

U.S. PATENT DOCUMENTS

| 4,174,467 | 11/1979 | Ferrieu | 179/18 HB |
| 4,184,053 | 1/1980 | Saneyoshi | 179/84 R |
| 4,192,975 | 3/1980 | Bruckman | 179/18 HB |
| 4,239,935 | 12/1980 | Bosik et al. | 179/84 R |

Primary Examiner—Gerald L. Brigance
Attorney, Agent, or Firm—Thomas A. Briody; William J. Streeter; Laurence A. Wright

[57] ABSTRACT

When electronic circuits are used for applying a conventional ringing voltage which has been superimposed on the conventional supply voltage, they require a high supply voltage. According to the invention an a.c. voltage is used in which that portion of each period in which the polarity is positive differs from the portion in which the polarity is negative. This a.c. voltage has a DC-component by means of which the condition of the subscriber's loop can be detected. The peak-peak value of the ringing voltage may be twice the maximum permissible voltage swing of a wire of the subscriber's line, which is an optimum.

3 Claims, 5 Drawing Figures

ARRANGEMENT FOR APPLYING A RINGING VOLTAGE TO A SUBSCRIBER'S LINE

The invention relates to an arrangement for applying a combination of a d.c. voltage signal and a low-frequency a.c. voltage signal to a subscriber's line of an automatic telephony system. The low-frequency a.c. voltage signal is used to actuate a ringing device forming part of the subscriber's apparatus. The invention comprises a low-frequency a.c. voltage generator from which two a.c. voltages are derived. The two a.c. voltages are applied in anti-phase to the different wires of the subscriber's line.

BACKGROUND OF THE INVENTION

The combination of a d.c. signal with an a.c. signal is widely known. The d.c. voltage signal is used as an auxiliary means to detect closure of the subscriber's loop when the called subscriber lifts the handset from its cradle.

In contemporary telephone exchanges a sinusoidal ringing voltage is superimposed on the DC-battery voltage, (FIG. 1 illustrates the voltage forms Va and Vb of the a- and the b-wire of the subscriber's line during ringing at a battery voltage of 48 volts and a ringing voltage of 80 volts r.m.s.=113 volt peak-peak value). When the ringing voltage is controlled by an electronic circuit, the magnitude of the required supply voltage for the circuit poses a problem. In the case of FIG. 1 the required supply voltage, allowing for a safety margin, will have to be, for example, 170 volts.

OBJECT OF THE INVENTION

The invention has for its object to apply a combination of a d.c. voltage signal and a ringing signal with a highest possible peak-peak value to the subscriber's line at a given maximum voltage swing on the a- and b-wires.

SUMMARY OF THE INVENTION

According to the invention the arrangement is therefore characterized in that means have been provided for forming the two low-frequency a.c. voltages such that the low-frequency a.c. voltage between the wires has a waveform in which the portion of each period during which the low-frequency a.c. voltage is positive with respect to the mean level of the said low-frequency a.c. voltage differs from the portion in which the said low-frequency a.c. voltage is negative, the mean level being the level located halfway between the extreme values of the said low-frequency a.c. voltage, as a result of which the low-frequency a.c. voltage between the wires of the subscriber's line has a direct current component which may serve for the d.c. voltage signal.

In this case a ringing voltage can be used which has a peak-peak value which is equal to twice the given maximum voltage swing of a wire of the subscriber's line, which is an optimum.

It should be noted that it is known from the "Proceedings of the International Zurich Seminar on Digital Communications", Mar. 7–9, 1978, pages D5.4–D5.5 to generate a d.c. voltage signal simultaneously with a low-frequency a.c. voltage signal by means of pulse-duration modulation of a binary signal with a comparatively high switching frequency in the range between 50 kHz and 100 kHz for an a.c. voltage signal of, for example, 25 Hz. No pulse-duration modulation is used in the present invention.

BRIEF DESCRIPTION OF THE DRAWINGS

The invention will now be further explained by way of example with reference to the accompanying Figures.

DETAILED DESCRIPTION OF THE PREFERRED EMBODIMENTS

Figure 1:
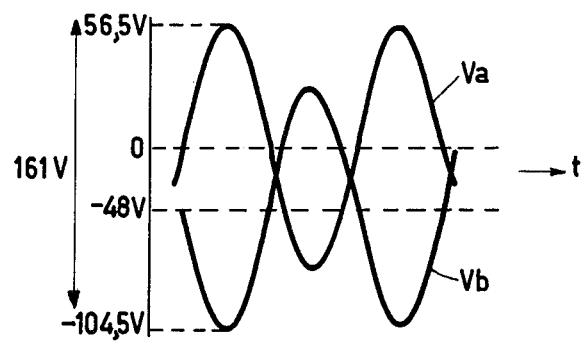
FIG. 1 shows the waveforms of the ringing voltage which occur on the a- and b-wires in known systems.

In known telephony systems, the ringing voltage is applied symmetrically to the subscriber's line and consists of an a.c. voltage of, for example, 25 Hz having an r.m.s., value of 80 volts. In combination with a supply voltage of −48 volts the situation illustrated in FIG. 1 is then obtained. FIG. 1 illustrates the waveforms on the a-wire and the b-wire. When these voltages are to be generated by electronic circuits, then these circuits require a supply voltage of approximately 170 volts, allowing for a safety margin. Integrated electronic circuits which can withstand such a voltage are not easy to realize.

Figure 2:
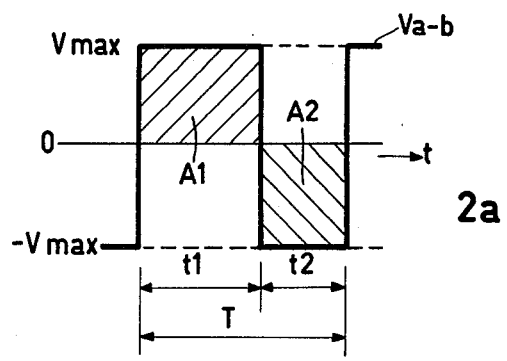
FIGS. 2a-2c shows the waveforms of the ringing voltage between the a- and b-wires and on the individual a- and b-wires, when the measures according to the invention are used.

In accordance with the invention, a ringing voltage is used as illustrated in FIGS. 2a-c. This ringing voltage is an a.c. voltage having a fundamental frequency of, for example, 25 Hz, the portion of each period during which the ringing voltage is positive has a longer duration, t1, then the other portion of the period which has the duration t2=T−t1. The polarity of an a.c. voltage is determined in a conventional manner relative to the mean level, which is located halfway between the extreme values of the a.c. voltage. In the present case, FIG. 2a, the mean level is zero volt.

The surface area A1 of the waveform in the positive portion of the period is larger than the surface area A2 of the waveform in the negative portion thereof. As a result, the ringing voltage has a DC-component and this component can be used as an aid in the detection of the loop condition of the subscriber's line during ringing.

The maximum permissible voltage swing of the a-wire and the b-wire is denoted by Vmax and it will be apparent from FIG. 2a that the ringing voltage Va-b between the a-wire and the b-wire may even be as high as 2 Vmax. The ratio between the surface areas A1 and A2 may become so large that a DC-component having the desired intensity of, for example, 10 volts occurs, which is sufficient for detecting the loop condition.

Figure 3:
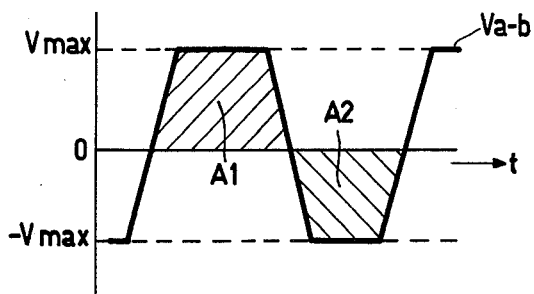
FIG. 3 shows an alternative waveform of the ringing voltage between the a- and b-wires.

The waveform shown in FIG. 2a has a large content of harmonic components and may perhaps not satisfy the requirements imposed by the telecommunications administrations. The trapezoidal shape shown in FIG. 3 is a more suitable signal shape with a smaller harmonic content.

Figure 4:
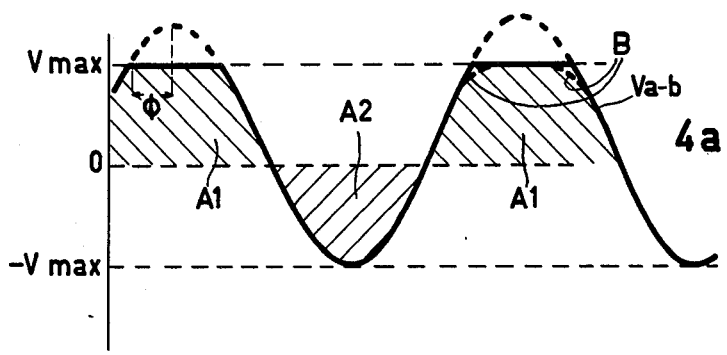
FIGS. 4a-4b shows a further alternative waveform of the ringing voltage between the a- and b-wires and on the individual a- and b-wire.
Figure 4:
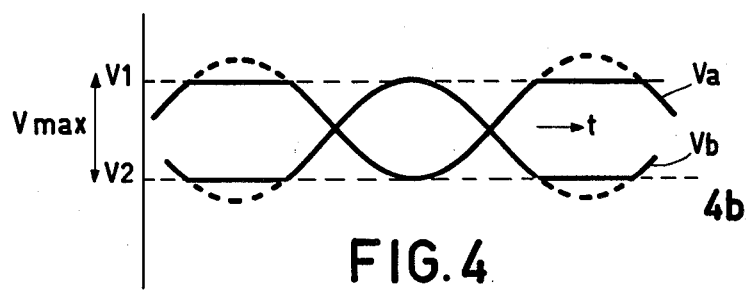

FIGS. 4a-b shows a further suitable signal shape. This is a single-sided "truncated" sinusoidal waveform of a uni-directionally limited sine wave. The value of the DC-component will depend on the angle $\phi$. For an angle $\phi = 0.75$ radians and a r.m.s. value of the sinusoidal ringing voltage of 80 volts (peak value 113 volts), the DC-component will be 10 volts. The harmonic distortion of this waveform is approximately 10%, which can be reduced by rounding the angles as shown at B in FIG. 4a.

Figure 5:
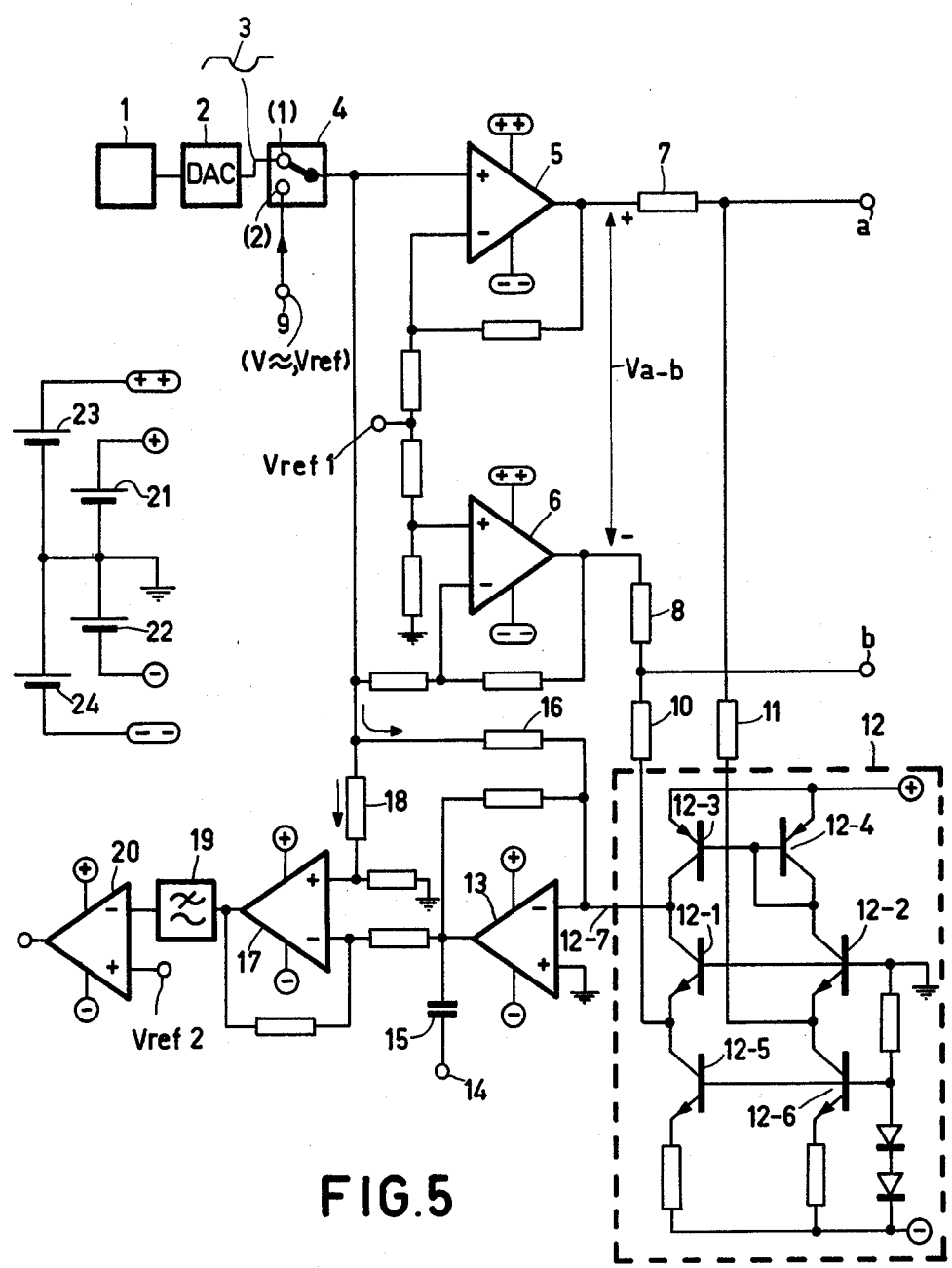
FIG. 5 shows the circuit diagram of a line circuit of an automatic telephone exchange in which the invention is used.

In the line circuit shown in FIG. 5, a ROM-memory 1 produces digitally encoded samples of the ringing voltage of the desired signal shape, which are converted into the analogue signal shape 3 by a DA-converter 2 having a low-pass filter included therein. When the switching circuit 4 is in the position (1) the ringing voltage is applied to a pair of operational amplifiers 5 and 6 which apply the ringing voltage in-phase to the a-wire and in anti-phase to the b-wire.

The subscriber's line is connected to the terminals a and b which are connected to the outputs of the operational amplifiers by way of supply resistors 7 and 8.

When switching circuit 4 is in position (2), speech signals ($V\approx$) and a reference d.c. voltage (Vref) can be applied to the operational amplifiers from terminal 9. At a desired supply voltage of, for example, 48 volts and a ten times voltage amplification in the operational amplifiers the reference voltage Vref=2.4 volts.

A reference voltage Vref 1 is applied to the operational amplifiers 5 and 6 to keep the outputs at a desired bias voltage. This bias voltage is, for example, $-24$ volts, so that when the voltage Vref=2.4 volts is applied to terminal 9 the a-wire assumes a voltage of zero volt and the b-wire a voltage of $-48$ volts.

In the intervals between the two ringing signals switching circuit 4 is set to position (2), a reference voltage Vref which is equal to the DC-component (for example 0.1 volt) of the ringing voltage produced by DA-converter 2 is then applied to terminal 9. The DC-voltage of the subscriber's line then remains the same during ringing and during the ringing intervals.

The terminals a and b are connected to a current-detection circuit 12 by means of high value resistors 10 and 11. Transistors 12-1 and 12-2 form a low-impedance termination for the resistors 10 and 11. Transistors 12-3 and 12-4 form a current mirror for producing the difference of the collector currents of the transistors 12-1 and 12-2, which difference is produced at output 12-7. Transistors 12-5 and 12-6 apply suitable bias currents to the transistors 12-1 and 12-2. The output current of circuit 12 depends linearly on the loop current of the subscriber's line.

Speech signals originating from the subscriber's line are applied by the operational amplifier 13 from output 12-7 to the output 14 for speech signals. This connection includes a capacitor 15 for blocking the direct current.

The signal applied by switching circuit 4 to the operational amplifiers 5 and 6 is applied to the operational amplifier 13 by way of resistor 16. This signal opposes the signal applied by the operational amplifiers 5 and 6 and circuit 12 to the amplifier 13. This opposition is complete for a subscriber's line which has an impedance which is equal to that of the resistors 7 and 8 available at the terminals a and b. At output 14 there then appears only the speech signal coming from the subscriber's line. This is the customary hybrid operation of a 4-wire-to-2-wire line termination.

For the detection of the loop condition the output signal of amplifier 13 is applied to the operational amplifier 17. The output signal of switching circuit 4 is applied to an amplifier 17 via a resistor 18. This reintroduces the d.c. voltage which had been removed from the input signal of amplifier 13 by resistor 16 in order to realize the hybrid operation.

The output signal of amplifier 17 is applied to an operational amplifier 20 via a filter 19. The filter 19 may comprise, for example, a comb filter to remove the harmonic components of the ringing voltage and a low-pass filter for cutting-off the speech signal.

The operational amplifier 20 compares the DC-output signal of filter 19 with a reference voltage Vref2. The output voltage of amplifier 20 is indicative of the loop condition of the subscriber's line. The voltage Vref2 may, for example, be adjusted so that the output voltage passes through zero volt when the loop condition of the subscriber's line changes.

When, after a subscriber has answered the call, the subscriber's line is supplied with 48 volts, Vref2 can be adjusted to an adapted value, so that a change in the loop condition again causes the output voltage of amplifier 20 to pass through zero volt.

The supply voltages, those of the amplifiers 5 and 6 excepted, are derived from the terminals marked + and − of the series-arranged batteries 21 and 22. The supply voltages of the amplifiers 5 and 6 have a higher value for accommodating the ringing voltages. These supply voltages are derived from the terminals marked + + and − − of the series-arranged batteries 23 and 24, which have a higher terminal voltage than the batteries 21 and 22.

What is claimed is:

1. An arrangement for applying a combination of a d.c. voltage signal and a low-frequency a.c. voltage signal to a subscriber's line of an automatic telephony system, the low-frequency a.c. voltage signal being used to actuate a ringing device forming part of the subscriber's apparatus, comprising a low-frequency a.c. voltage generator from which two low-frequency a.c. voltages are derived which are applied in anti-phase phases to different wires of the subscriber's line, characterized in that means have been provided for forming the two low-frequency a.c. voltages such that the low-frequency a.c. voltage between the wires has a waveform in which the portion of each period during which the said low-frequency a.c. voltage is positive with respect to the mean level of the said low-frequency a.c. voltage differs from the portion during which the said low-frequency a.c. voltage is negative, the mean level being located halfway between the extreme values of the said low-frequency a.c. voltage, as a result of which the low-frequency a.c. voltage between the wires of the subscriber's line has a direct current component which may be used as the d.c. voltage signal.

2. An arrangement as claimed in claim 1, characterized in that the low-frequency a.c. voltage varies trapezoidally during each portion of the period.

3. An arrangement as claimed in claim 1, characterized in that the low-frequency a.c. voltage has an asymmetric truncated sinusoidal waveform.

* * * * *